(12) United States Patent
Wisniewski

(10) Patent No.: US 10,035,216 B2
(45) Date of Patent: Jul. 31, 2018

(54) METHOD OF JOINING MULTIPLE COMPONENTS AND AN ASSEMBLY THEREOF

(71) Applicant: GM GLOBAL TECHNOLOGY OPERATIONS LLC, Detroit, MI (US)

(72) Inventor: Chris J. T. Wisniewski, Oshawa (CA)

(73) Assignee: GM Global Technology Operations LLC, Detroit, MI (US)

( * ) Notice: Subject to any disclaimer, the term of this patent is extended or adjusted under 35 U.S.C. 154(b) by 345 days.

(21) Appl. No.: 14/837,369

(22) Filed: Aug. 27, 2015

(65) Prior Publication Data

US 2017/0057005 A1 Mar. 2, 2017

(51) Int. Cl.

| | | |
|---|---|---|
| *B23K 20/10* | (2006.01) | |
| *F16B 11/00* | (2006.01) | |
| *B23K 20/227* | (2006.01) | |
| *B29C 65/48* | (2006.01) | |
| *F16B 5/08* | (2006.01) | |
| *F16B 19/06* | (2006.01) | |
| *B23K 103/16* | (2006.01) | |
| *F16B 5/04* | (2006.01) | |

(52) U.S. Cl.
CPC ............ *B23K 20/10* (2013.01); *B23K 20/227* (2013.01); *B29C 65/48* (2013.01); *F16B 5/08* (2013.01); *F16B 11/006* (2013.01); *B23K 2203/172* (2015.10); *F16B 5/04* (2013.01); *F16B 19/06* (2013.01)

(58) Field of Classification Search
CPC .... F16B 5/04; F16B 5/065; F16B 5/08; F16B 19/06; F16B 19/04
See application file for complete search history.

(56) References Cited

U.S. PATENT DOCUMENTS

| | | | | |
|---|---|---|---|---|
| 5,629,823 | A | * 5/1997 | Mizuta | ..................... F16B 5/065 360/133 |
| 6,083,604 | A | * 7/2000 | Haraga | ..................... F16B 5/00 403/375 |
| 9,643,356 | B2 | * 5/2017 | Matsuo | ................... B23K 11/11 |
| 9,759,247 | B2 | * 9/2017 | Karner | ....................... F16B 5/08 |

(Continued)

FOREIGN PATENT DOCUMENTS

| | | | | |
|---|---|---|---|---|
| CN | | 103423257 A | 12/2013 | |
| DE | | 2049142 A1 | * 4/1972 | ........... B23K 11/115 |

(Continued)

*Primary Examiner* — Jonathan P Masinick
(74) *Attorney, Agent, or Firm* — Quinn IP Law

(57) ABSTRACT

A method of joining multiple components is disclosed. The method includes arranging a first component having a first surface, an opposing second surface, and a feature, in contact with a second component having a first surface, an opposing second surface, and defining an aperture. When so arranged, the first surface of the first component is adjacent to the second surface of the second component. The method also includes positioning a fastener on the first surface of the second component and in contact with the feature of the first component, such that at least a portion of the fastener overlaps the aperture on the first surface of the second component. The method additionally includes abutting and fusing the fastener to the feature of the first component to thereby affix the first component to the second component.

16 Claims, 2 Drawing Sheets

(56) References Cited

U.S. PATENT DOCUMENTS

| | | | | |
|---|---|---|---|---|
| 2008/0229570 A1* | 9/2008 | Koppitz | ................ | B23K 9/201 29/525.11 |
| 2009/0139821 A1* | 6/2009 | Koppitz | .................. | B23K 9/20 192/3.29 |
| 2011/0097142 A1* | 4/2011 | Bassler | .............. | B23K 11/0046 403/337 |
| 2014/0369788 A1* | 12/2014 | Chang | .................. | F16B 19/008 411/501 |
| 2015/0001189 A1* | 1/2015 | Spinella | ................ | B23K 35/28 219/99 |
| 2015/0050068 A1* | 2/2015 | Morris | .................... | F16B 5/065 403/14 |
| 2015/0063902 A1* | 3/2015 | Schneider | ............ | B21D 53/88 403/266 |
| 2015/0093177 A1* | 4/2015 | Morris | .................... | F16B 5/065 403/13 |
| 2015/0098755 A1* | 4/2015 | Karner | ..................... | F16B 5/08 403/270 |
| 2016/0084288 A1* | 3/2016 | Chung | .................. | F16B 19/086 219/86.1 |
| 2016/0123362 A1* | 5/2016 | Iwase | .................... | B23K 11/00 411/82 |
| 2017/0023038 A1* | 1/2017 | Izuhara | .................... | F16B 5/04 |
| 2017/0089372 A1* | 3/2017 | Fandl | ....................... | F16B 5/08 |

FOREIGN PATENT DOCUMENTS

| | | | | |
|---|---|---|---|---|
| DE | 102014201871 A1 | * | 8/2015 | ......... B23K 11/0046 |
| DE | 102014107911 A1 | * | 12/2015 | ........... B21D 39/032 |
| DE | 102015216539 A1 | * | 3/2017 | .................. F16B 5/04 |
| JP | 2015083869 A | * | 4/2015 | ............ B29C 65/562 |
| JP | 2015083870 A | * | 4/2015 | ................ F16B 5/08 |
| WO | WO-2015015906 A1 | * | 2/2015 | ............. B23K 11/11 |
| WO | WO-2016117226 A1 | * | 7/2016 | ............. B23K 11/14 |
| WO | WO-2017110531 A1 | * | 6/2017 | ............. B23K 11/20 |
| WO | WO-2017170106 A1 | * | 10/2017 | ................ B23K 9/02 |

\* cited by examiner

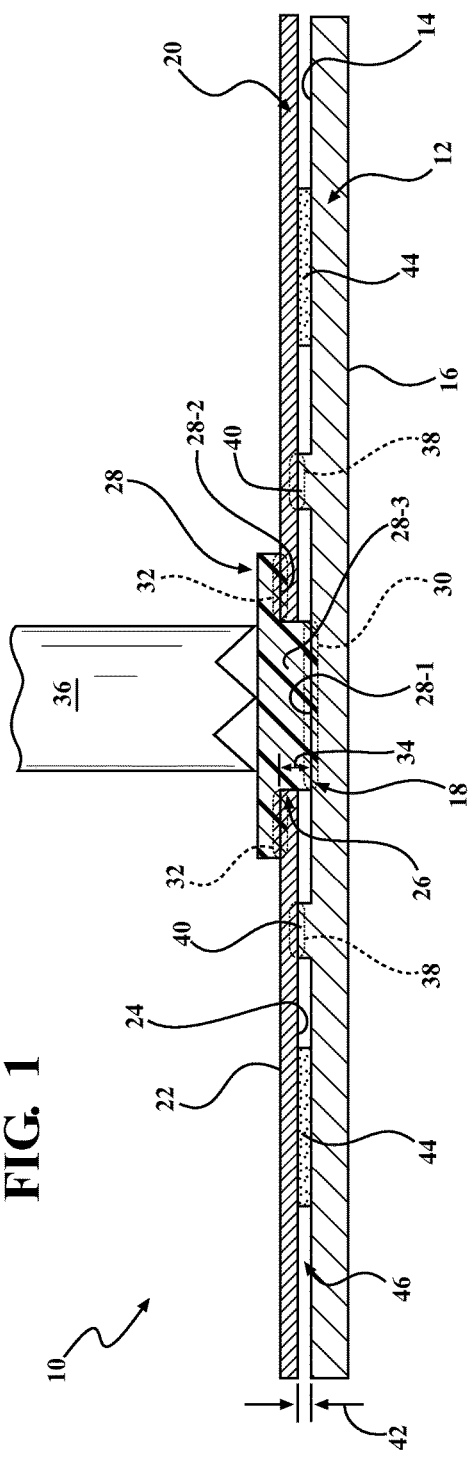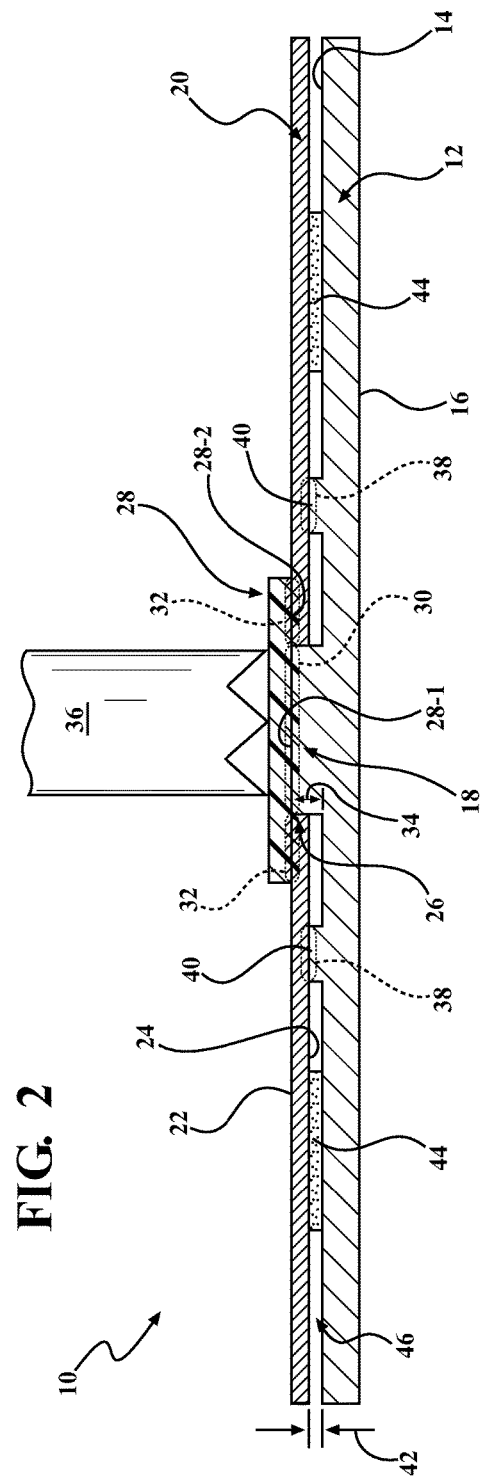

METHOD OF JOINING MULTIPLE COMPONENTS AND AN ASSEMBLY THEREOF

TECHNICAL FIELD

The disclosure relates to a method of joining multiple components.

BACKGROUND

Various processes and mechanisms are available in manufacturing for linking or joining various components. A specific joining process and/or mechanism is typically selected based on the materials of the components sought to be joined and the operating conditions that the structure formed from the joined components will be asked to endure. Additionally, a specific joining process and/or mechanism may be selected based on access conditions of the components sought to be joined and whether the subject components are sought to be joined permanently or are required to be separable.

Vehicle structures are commonly formed from different types and grades of various materials such as steel, aluminum, magnesium, and plastic. Frequently, additional reinforcing members are used to buttress the vehicle structure, as well as for supporting various chassis and powertrain subsystems. Joining processes for forming vehicle structures and additional reinforcing/supporting members are typically selected with consideration given to at least some of the factors noted above. Common joining processes for vehicle structures include the use of welding, gluing, and various mechanical fasteners.

SUMMARY

A method of joining multiple components is disclosed. The method includes arranging a first component having a first surface, an opposing second surface, and a feature, in contact with a second component having a first surface, an opposing second surface, and defining an aperture. When so arranged, the first surface of the first component is adjacent to the second surface of the second component. The method also includes positioning a fastener on the first surface of the second component and in contact with the feature of the first component, such that at least a portion of the fastener overlaps the aperture on the first surface of the second component. The method additionally includes abutting and fusing the fastener to the feature of the first component, such that the fastener affixes the first component to the second component.

The first component can be constructed from plastic and the second component can be constructed from metal or a dissimilar plastic.

The plastic may be a carbon fiber reinforced thermoplastic (CFRTP) and the metal can be steel. The second component material could also be a thermoset plastic.

The fastener can be a one-sided rivet constructed from plastic.

The one-sided rivet can be a button or a disc.

In the embodiment where the one-sided rivet is a disc, the feature of the first component can be a post extending through the aperture to abut the disc.

In the embodiment where the one-sided rivet is a button, the button may have a shank and the feature of the first component may be a pad configured to accept the shank. In such a case, the shank can be inserted through the aperture to abut the pad.

The act of fusing the fastener to the feature of the first component can include welding.

The welding can be ultrasonic welding. The welding can also be friction welding.

The first component may additionally include a spacer molded into the first surface thereof. In such a case, the act of arranging the first component in contact with the second component may include affixing the first component to the second surface of the second component via an adhesive and generating a gap for the adhesive via the spacer.

A multiple-component assembly including the above elements is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

BRIEF DESCRIPTION OF THE DRAWINGS

FIG. 1 is a schematic illustration of a cross-section of stacked multiple components being joined into a multiple-component assembly by welding according to an embodiment of the present disclosure.

FIG. 2 is a schematic illustration of a cross-section of stacked multiple components being joined into a multiple-component assembly by welding according to another embodiment of the present disclosure.

DETAILED DESCRIPTION

Figure 3:
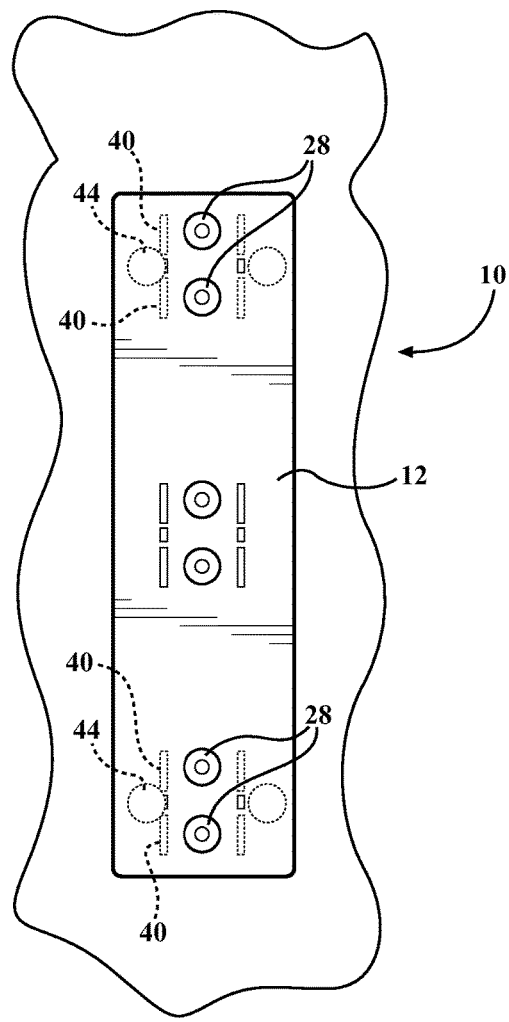
FIG. 3 is a schematic top view illustration of the stacked multiple components shown in FIGS. 1 and 2 after being joined into the multiple-component assembly.

Referring to the drawings in which like elements are identified with identical numerals throughout, FIGS. 1-3 illustrate a multiple-component assembly 10. The assembly 10 includes a first component 12 having a first, or top, surface 14, an opposing second, or bottom, surface 16. The first component 12 also has a feature 18, which can be either a button or a pad, as set forth below. The assembly 10 also includes a second component 20 having a first, or top, surface 22 and an opposing second, or bottom, surface 24. The second component 20 additionally defines an aperture 26.

As shown, the second component 20 is arranged in contact with the first component 12 such that the top surface 14 of the first component becomes adjacent to the bottom surface 24 of the second component. The first component 12 may be constructed from plastic, while the second component 20 may be constructed from metal or a dissimilar plastic. The plastic used for the first component 12 may be a thermoplastic, such as a carbon fiber reinforced thermoplastic (CFRTP), while the material used for the second component 20 may be any thermoset plastic material, which would not be compatible for welding directly to the thermoplastic. The metal to be used for the second component 20 may be steel.

The assembly 10 also includes a fastener 28. Similar to the first component 12, the fastener 28 may be constructed from plastic. The fastener 28 can be a one-sided rivet having a shape of a button, as shown in FIG. 1 or a shape of a disc, as shown in FIG. 2. Each embodiment of the one-sided rivet fastener 28, whether that of FIG. 1 or FIG. 2, has a first end or side 28-1 and a second end or side 28-2. However, as will be described in detail below, the two embodiments of the one-sided rivet fastener 28 differ in the way the two ends 28-1 and 28-2 are constructed. The term "rivet" is herein employed to identify a particular fastening objective and function of the fastener 28 that can be fixed in place without the use of adhesive, being forcibly driven, or threadably tightened with respect to the first and second components 12, 20. However, the subject fastener 28 can be distinguished from a traditional rivet in a few respects.

Typically, as initially formed, a traditional rivet includes a generally smooth cylindrical shaft, a.k.a., tail, disposed along a center axis and connected to a preformed head on one of the shaft ends. The shaft has a shaft diameter and the preformed head has a head diameter. Generally, prior to installation, the head diameter is greater than the shaft diameter. During installation, a traditional, non-self-piercing, rivet is placed in a preformed aperture that runs through components to be assembled. The preformed head bottoms out on one side of the assembly, while a portion of the tail emerges on the opposite side of the assembly and is then mechanically upset or bucked, i.e., deformed, so that the tail expands to about 1.5 times the original shaft diameter, thus forming a shop head or buck-tail. The buck-tail holds the traditional rivet in place. The original preformed head and the newly-formed buck-tail permit the traditional rivet to withstand tension loads i.e., loads parallel to the axis of the shaft, while the shaft positioned in the aperture that runs through the components being held together can withstand shear loads, i.e., loads perpendicular to the axis of the shaft.

The fastener 28, on the other hand, is not intended to extend all the way through each of the first and second components 12, 20, and reliable assembly of the first and second components does not depend on a mechanically deformed end. Instead, as shown in each of the FIGS. 1 and 2, the fastener 28 is secured to the first component 12, while sandwiching the second component 20 between itself and the second component. Specifically, the fastener 28 generates a fused first interface 30 between the first end 28-1 and the feature 18, and an overlapping second interface 32 between the second end 28-2 and the second component 20.

During assembly, the fastener 28 is positioned against the first surface 22 of the second component 20, and is abutted to, i.e., butts up against, the feature 18 of the first component 12, such that at least a portion of the second end 28-2 overlaps the aperture 26 on the first surface of the second component. The second end 28-2 of the fastener 28 is additionally fused to the feature 18, such that the fastener affixes the first component 12 to the second component 20. As noted above, the fastener 28 can have a shape of a button or a shape of a disc. In the embodiment where the one-sided rivet fastener 28 is a button, the button includes a boss or a shank 28-3 culminating in the first end 28-1 and the feature 18 of the first component 12 is a pad configured to accept the shank. The shank 28-3 has a length identified in FIG. 2 with numeral 34. As shown in FIG. 1, the shank 28-3 is inserted through the aperture 26 and abuts the pad, i.e., feature 18.

On the other hand, in the embodiment where the one-sided rivet fastener 28 is a disc, as shown in FIG. 2, the feature 18 of the first component 12 is a post extending through the aperture 26 and abutting the disc. Similar to the shank 28-3, the post has a length identified with numeral 34 in FIG. 3. In the embodiment of FIG. 2, the first side 28-1 of the disc fastener 28 includes a portion that overlaps the aperture 26 on the first surface 22 of the second component 20, while the second side 28-2 becomes fused to the post, i.e., the feature 18 in the present example. In either of the embodiments shown in FIG. 1 or 2, the fastener 28 can be fused to the feature 18 of the first component 12 via a welding process.

The particular type of process for fusing the fastener 28 to the feature 18 can be ultrasonic or friction welding. As shown in FIGS. 1 and 2, ultrasonic welding can be achieved by a local application of high-frequency ultrasonic acoustic vibration via a weld horn 36 to the first interface 30 between the first end 28-1 of the fastener 28 and the feature 18. During such application of the ultrasonic acoustic vibration, the first and second components 12, 20 together with the fastener 28 can be held together under pressure to stabilize the assembly in order to create a solid-state weld. As shown in FIG. 3, friction welding can be achieved via generation of heat through mechanical friction by moving or rotating the fastener 28 against the feature 18 of the first component 12. A lateral force can also be added during the friction-welding process to plastically displace and fuse the materials of the fastener 28 and the feature 18. In either ultrasonic welding or friction welding described above, there are no connective bolts, nails, soldering materials, or adhesives necessary to bind materials of the fastener 28 and the feature 18 of the first component 12 together.

In addition to the fused first interface 30, as well as the overlapping second interface 32, the multiple-component assembly 10 can include a third interface 38 between the first component 12 and the second component 20. Specifically, one or more spacers 40 can be molded into the first surface 14 of the first component 12, as shown in FIGS. 1-2 for providing the third interface 38 between the first and second components 12, 20. The first component 12 can then be affixed to the second component 20 with the spacer(s) 40 providing separation between the first surface 14 and the second surface 24. A height 42 of spacers 40 can be selected to establish specific spacing or gap 46 between the first and second components, that accommodates the length 34 of either the shaft 28-3 in FIG. 1 or of the feature 18 structured as the post of the first component 12 in FIG. 2. Accordingly, the spacer(s) 40 can facilitate generation of even spacing between the first and second components 12, 20 in the multiple-component assembly 10 at a distance from the first and second interfaces 30, 32, thus providing enhanced stability for the assembly. Furthermore, an adhesive 44 can be applied between the first and second components 12, 20 in areas both surrounding and distant from the fastener 28. In such a case, the spacer(s) 40 can serve to generate and maintain the gap 46 having the height 42 between the first component 12 and the second component 20 for the adhesive 44. Each spacer 40 can be molded into the first surface 14 at any location on the first component 12 to establish a desired arrangement and spacing in the multiple-component assembly 10 between the fastener 28, the spacer, and the adhesive 44.

Figure 4:
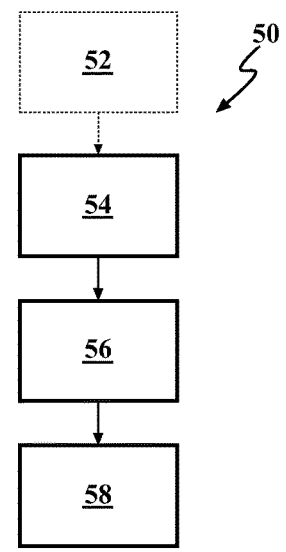
FIG. 4 is a flow chart illustrating a method of joining multiple components according to the present disclosure.

FIG. 4 depicts a method 50 of generating the multiple-component assembly 10 as described above with respect to FIGS. 1-3. The method commences in frame 54 with arranging the first component 12 in contact with a second component 20, such that the first surface 14 of the first component is adjacent to the second surface 24 of the second component. Prior to frame 54, in frame 52, the method may include applying the adhesive 44 between the first and second components 12, 20, as described above. The adhesive 44 can be applied either to the either the first component 12 or the second component 20. As part of arranging the first component 12 in contact with the second component 20, the method may include affixing the first component to the second surface of the second component via the adhesive 44 and generating the gap 46 for the adhesive via the spacer 40. As described with respect to FIG. 2, the spacer 40 can be molded into the first surface 14 of the first component 12.

Following frame 54, the method proceeds to frame 56, where the method includes positioning the fastener 28 on the first surface 22 of the second component 20 and in contact with the feature 18 of the first component 12, such that at least a portion of the fastener overlaps the aperture 26 on the first surface of the second component. After frame 56, the method advances to frame 58, where it includes abutting and fusing the fastener 28 to the feature 18 of the first component 12 and thereby affixing the first component to the second component 20 via the fastener.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method of joining multiple components, the method comprising:
    arranging a first component having a first surface, an opposing second surface, a feature, and a spacer projecting from the first surface and separated by a portion of the first surface from the feature, such that each of the feature and the spacer is in contact with a second component, wherein:
        the second component has a first surface, an opposing second surface, and defines an aperture, such that the first surface of the first component is adjacent to the second surface of the second component
    positioning a one-sided rivet on the first surface of the second component and in contact with the feature of the first component, such that at least a portion of the fastener overlaps the aperture on the first surface of the second component, wherein the one-sided rivet is a disc, and the feature of the first component is a post
    extending the post through the aperture and completely through the second component
    arranging entirety of the disc on top of the post and above the second component; and
    abutting and fusing the disc to the post and thereby affixing the first component to the second component via the fastener.

2. The method of claim 1, wherein the first component is constructed from plastic and the second component is constructed from metal.

3. The method of claim 2, wherein the plastic is a carbon fiber reinforced thermoplastic (CFRTP) and the metal is steel.

4. The method of claim 2, wherein the fastener is constructed from plastic.

5. The method of claim 1, wherein said fusing the fastener to the feature of the first component includes welding.

6. The method of claim 5, wherein said welding is ultrasonic welding or friction welding.

7. The method of claim 1, wherein the spacer is molded into the first surface the first component.

8. The method of claim 1, wherein arranging the first component in contact with the second component includes affixing the first component to the second surface of the second component via an adhesive and generating a gap for the adhesive via the spacer.

9. A multiple-component assembly comprising:
    a first component having a first surface, an opposing second surface, a feature, and a spacer projecting from the first surface and separated by a portion of the first surface from the feature;
    a second component having a first surface and an opposing second surface, and defining an aperture, wherein the second component is arranged in contact with the first component such that the first surface of the first component is adjacent to the second surface of the second component; and
    a one-sided rivet positioned on the first surface of the second component abutted and fused to the feature of the first component, such that at least a portion of the fastener overlaps the aperture on the first surface of the second component, such that the fastener affixes the first component to the second component;
    wherein the one-sided rivet is a disc, and the feature of the first component is a post extending through the aperture and completely through the second component, and abutting the disc, and wherein entirety of the disc is arranged on top of the post and above the second component.

10. The multiple-component assembly of claim 9, wherein the first component is constructed from plastic and the second component is constructed from metal.

11. The multiple-component assembly of claim 10, wherein the plastic is a carbon fiber reinforced thermoplastic (CFRTP) and the metal is steel.

12. The multiple-component assembly of claim 10, wherein the fastener is constructed from plastic.

13. The multiple-component assembly of claim 9, wherein the fastener is fused to the feature of the first component via welding.

14. The multiple-component assembly of claim 13, wherein the welding is ultrasonic welding or friction welding.

15. The multiple-component assembly of claim 9, wherein the spacer is molded into the first surface of the first component.

16. The multiple-component assembly of claim 9, wherein the first component is affixed to the second surface of the second component via an adhesive and a gap is generated for the adhesive via the spacer.

* * * * *